May 6, 1969     J. H. MALVEN     3,442,265

METHOD OF APPLYING A MEDICAL SPLINT

Filed Feb. 14, 1966

INVENTOR.
John H Malven

United States Patent Office 3,442,265
Patented May 6, 1969

---

3,442,265
METHOD OF APPLYING A MEDICAL SPLINT
John H. Malven, 1230 E. Mission Lane,
Phoenix, Ariz. 85020
Filed Feb. 14, 1966, Ser. No. 538,508
Int. Cl. A61f 5/04
U.S. Cl. 128—90         1 Claim

ABSTRACT OF THE DISCLOSURE

A splint for holding broken bones in position after they have been set comprising a thermal plastic structure adapted to conform with a broken limb, and having a reflective means provided with a slot therein adapted to permit heating of the thermal plastic through the slot to allow the thermal plastic to be readily bent to place the splint over the limb.

---

This invention pertains to splints used for holding broken bones in position after they have been set by a doctor.

One of the objects of the invention is to provide a new and more efficient means for holding the bones in set than the methods heretofore used of enclosing the broken bones in plaster of Paris. Heretofore whenever a bone of one of the limbs of the human body was broken the part was enclosed in a plaster-Paris cast. This served to hold the parts in correct position and to assist in holding the broken parts in traction when this was desirable.

The plaster-Paris cast has served its purposes for many years but is heavy and cumbersome and sometimes very hard to apply.

The objects of this invention are first; to provide a means for holding the bones in place and/or in traction hereinafter called a splint. This name comes from the old practice of encasing the broken limb in plaster-Paris, or in which solid objects such as splinters of wood were embedded. In this invention a new substance is used not heretofore known or used for the purpose here concerned. This substance is thermo-plastic plastic such as Plexiglas. This plastic has the properties of softening under comparatively low heat and hardening again when the heat is removed. A second object of the invention is to provide a splint composed of thermo-plastic plastic of the type heretofore described which is made of sheet material previously bent to approximate the desired shape needed to support the bones in their correct relative position.

Another object is that these splints are easy to attach to and remove from the limb containing the broken bones; for redressing or treating the injured member.

Still another object is to provide a method of applying the plastic to the broken limb in a manner so that it can be molded or formed on the limb without injury to the patient and will then harden so as to hold the limb in correct position for mending.

Still further object is to provide a method of protecting the flesh of the broken limb from heat likely to damage it or to cause pain but still permit the plastic to be heated on the limb to a point where it can be bent or molded to best support the limb until the plastic substance is rehardened.

Other objects will appear hereinafter.

I attain the foregoing objects by means and apparatus hereinafter described and illustrated in the accompanying drawings.

In the drawing FIGURE 1 is a plan view of a splint made from a sheet of plastic bent and curved to approximate the limb of the patient on which it is used; the solid lines represent the finished position of the parts of the plastic and the dotted lines represent a temporary position that the plastic is given so that the limb may be easily inserted into the splint formed by the plastic.

Similar numerals refer to similar parts in the several views.

Figure 1:
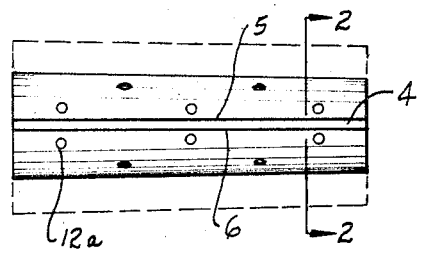
Figure 2:
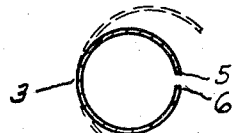
FIGURE 2 is a cross section taken on line 2—2 of FIGURE 1.
Figure 3:
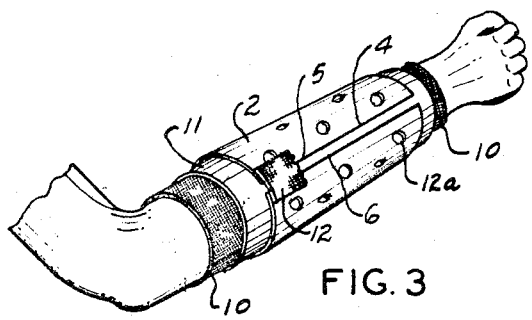
FIGURE 3 is a perspective view of the device as applied to the limb of a patient.
Figure 4:
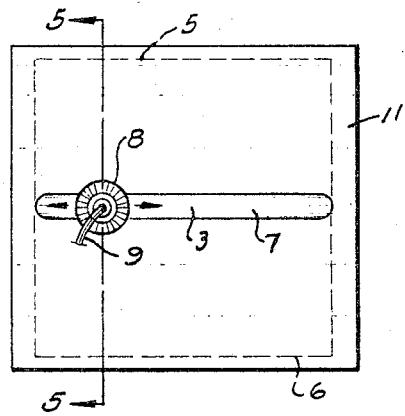
FIGURE 4 is a plan view of a limited softening operation.
Figure 5:
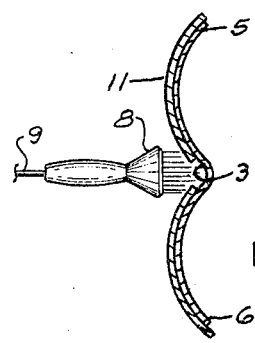
FIGURE 5 is a section taken substantially on line 5—5 of FIGURE 4.

A sheet of plastic 2 is heated until soft and then bent to the approximate shape shown in solid lines in FIGURES 1 and 3.

This is then stored ready for use by a doctor who desires to apply it to a patient's broken limb. This splint is made to approximate the final shape of the splint as desired.

When this splint is to be used it is heated along a strip area 3 opposite the opening 4 between the two adjacent edges 5 and 6 of the original splint.

The strip area is heated by masking all but the portion that will be bent by aluminum foil 11. This aluminum foil has a window 7 through which heat from a radiant source such as heat lamp 8 operated by electricity from any convenient source 9.

When the plastic has softened sufficiently by heat radiating through the window 7 the splint is opened by moving the edges 5 and 6 apart enough so that the splint may be easily opened and placed over the injured limb. Thereafter the splint is closed around the limb by moving the edges 5 and 6 toward each other. It is not necessary that the edges 5 and 6 actually contact. The splint will hold in place on the limb even though the edges 5 and 6 do not touch or overlap.

The type of plastic necessary for this operation is known as polymethyl methacrylate. This substance is known to the trade as Plexiglas. It has a softening point of about 250° F. at which point it becomes soft and pliable but not fluid. Upon cooling it rehardens at approximately 180° F. Other plastics of similar heating and cooling characteristics may be used if desired.

While I have described the process of heating by the use of radiant heating from heat lamp it is to be understood that any source of heat may be used that can be controlled within the temperature limits desired. For example; the plastic sheet from which the splint is made may be placed in an oven and brought to the proper temperature and then placed on the injured limb.

To protect the skin of the patient from painful exposure to heat the skin is first covered with fabric 10. Over this fabric a sheet of aluminum foil is placed. Any ordinary thickness is sufficient for this foil because heat will not penetrate it.

After the plastic has cooled and hardened it may be held in the usual manner with surgical tape, or by its shape, or by any other convenient means. After the bone has knit the splint is removed by removing the binding tape 12, either by softening the adhesive on the tape or by cutting the tape in several places, then softening the splint along a convenient strip or springing it open and removing in a reverse manner.

The advantages of this type of splint are that it is light and ventilating holes 12a may be added to prevent undue sweating and allow air to get to the injury. Further the substance mentioned is adequately strong and stiff at all ordinary temperatures to which it may be subjected. Furthermore splints may be prepared in a semi-finished shape and then applied to the limb as above described.

When preformed plastic is heated in strips for application, foil is not needed between patient and plastic as cloth or dressing furnishes enough protection to prevent harm or injury to patient.

The device and method lends itself to a variety of uses. The splints in semi-finished form may be furnished the surgeon or doctor ready for use. It is only necessary for him to heat a small portion of the semi-finished splints in order to apply them to the patient. It is also possible for the splints to be used many times, simply by reheating and reforming the original splint. The splint may be used for all types of surgical braces as plastic can be formed to conform easily to the individual body.

I claim:

1. The method of holding broken bones in place on a limb of a person while they knit comprising (a) applying a layer of fabric around said limb; then (b) applying a layer of metal foil around said fabric (c) providing to one side of a sheet of thermal setting plastic a layer of metal foil having a slot therein to admit radiant heat to a predetermined area of the plastic which is to be bent, said thermal setting plastic having a softening point of approximately 250 degrees Fahrenheit and rehardening point of approximately 180 degrees Fahrenheit; (d) applying radiant heat through the slot in the metal foil so as to soften the exposed area of said thermal setting plastic (e) applying the softened sheet plastic to the foil on the limb and bending said plastic sheet at said predetermined softened area around said limb whereby said plastic sheet will then harden to form a splint to hold the bones of the limb in correct position for mending.

References Cited

UNITED STATES PATENTS

| | | | |
|---|---|---|---|
| 3,089,486 | 5/1963 | Pike | 128—90 |
| 3,314,419 | 4/1967 | Quick | 128—90 |

OTHER REFERENCES

"Moulding Polythene Plastic Splints Direct to Patient," The Lancet, Nov. 6, 1954, pp. 948–951.

"Plastic Splints and Appliances in Orthopedic Surgery," The Journal of Bone and Joint Surgery, May 1948, vol. 30B, No. 2; pp. 298–308.

RICHARD A. GAUDET, *Primary Examiner.*

J. D. YASKO, *Assistant Examiner.*